May 21, 1935.  W. L. MORRISON  2,001,743
MIRROR DEVICE
Filed Oct. 22, 1931
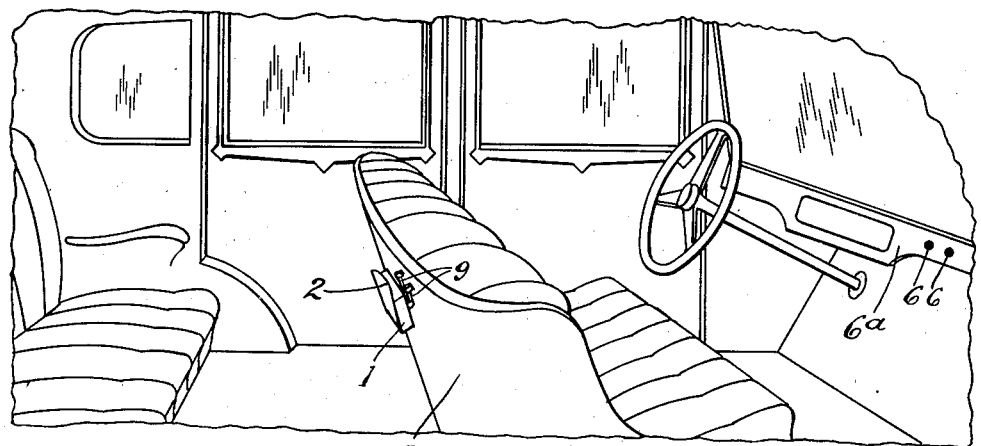
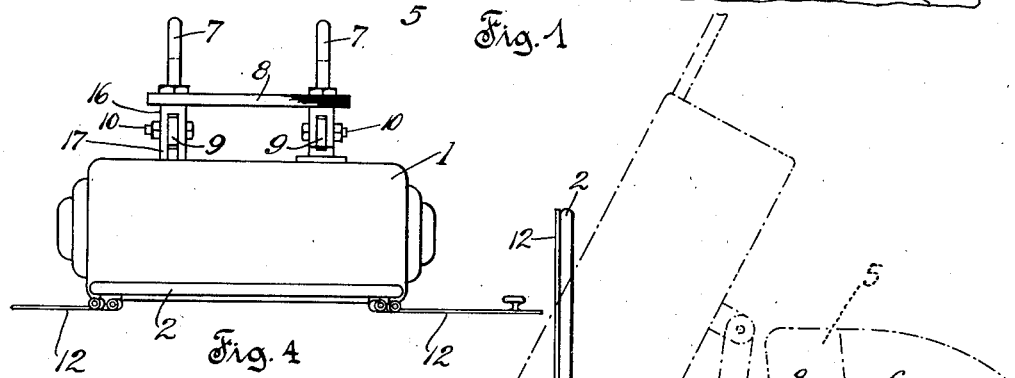
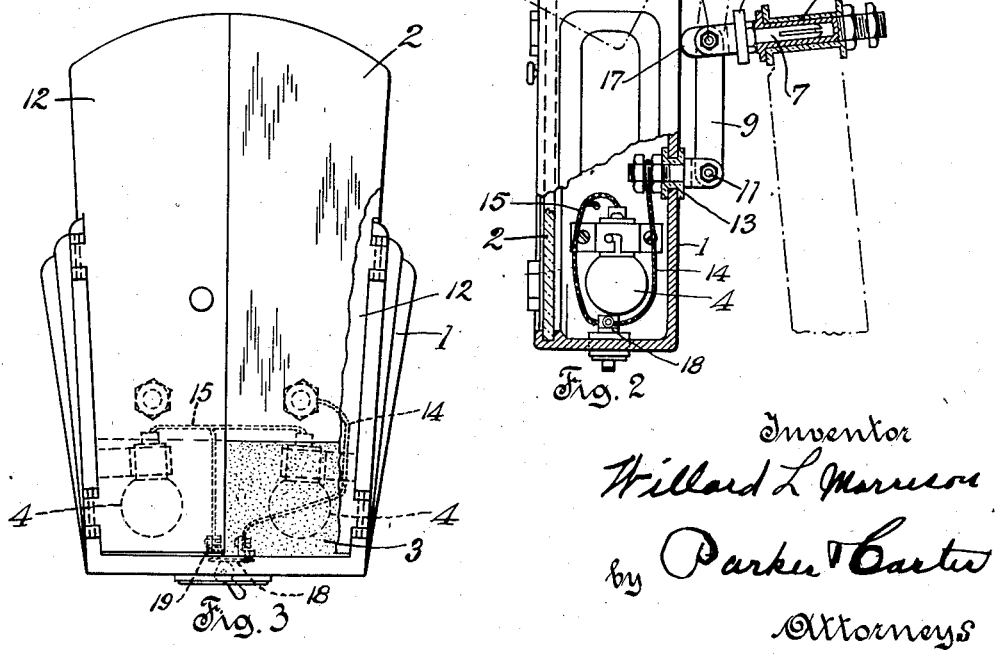
Inventor
Willard L. Morrison
by Parker & Carter
Attorneys Patented May 21, 1935

2,001,743

UNITED STATES PATENT OFFICE

2,001,743
MIRROR DEVICE

Willard L. Morrison, Chicago, Ill., assignor to The Dole Valve Company, Chicago, Ill., a corporation of Illinois Application October 22, 1931, Serial No. 570,369

2 Claims. (Cl. 240—4.1)

This invention relates to improvements in mirror devices and has for its object to provide a new and improved device of this description. The invention has a further object to provide an illuminated mirror device arranged so that the light lights the face of the user without glare. The invention has as a further object to provide an illuminated mirror device particularly adapted to be used in automobiles. The invention has further objects which are more particularly pointed out in the accompanying description.

Referring now to the drawing, Fig. 1 is a perspective view of the interior of a car showing the mirror device in position on the back of the front seat;

Fig. 2 is a side view of the mirror device with the casing partially broken away and showing one method of connecting the device to the seat;

Fig. 3 is a front view of the mirror device with the doors closed, one of the doors being broken away;

Fig. 4 is a plan view of the device showing the doors open.

Like numerals refer to like parts throughout the several figures.

Referring now to the drawing, I have shown the mirror device as particularly adapted for use in connection with automobiles. In this construction there is provided a casing 1. A mirror 2 is mounted in the front of this casing and is preferably removably connected therewith, the front of the mirror facing outward. Located below the mirror is a piece 3 of glass, preferably ground glass or glass so treated that lights behind it will not produce a glare in the face of the user. This glass is, therefore, preferably translucent. Back of the glass 3 I provide one or more electric lamps 4. The back of the seat 5 is provided with sockets 6 in which are received the plugs 7, by means of which the lamps 4 are electrically connected in circuit. The plugs 7 are connected together by a connecting piece 8 so that they will always be in the same relative position and will thus find their sockets. Links 9 are pivotally connected with the connecting piece 8 at 10. These links are pivotally connected at 11 with the casing 1.

I prefer to provide doors 12 in front of the mirror so that these doors can be closed if desired and obstruct the view of the mirror.

In the use of the device the plugs are inserted in the sockets in the seat, and when the device is not in use it is down out of the way, as shown in Fig. 1. When it is desired to use the mirror, the casing is pulled up to the position shown in dotted lines in Fig. 2, where it can be properly adjusted to be in proper position for the user. The doors are opened and the mirror then used. The casing may also be used for powder puffs and cosmetics.

A switch for the lights is provided so that they may be turned off or on. These lights may also be used for lighting the car, if desired. It will be seen that they are back of the driver and face rearwardly and therefore do not produce glare which interferes with the driver, as the case with the lighting lamps now used.

The section or piece of material below the mirror must be of such material as to transmit light, that is, it must be of light transmitting material and preferably provided with means for preventing glare.

When the device is to be used by a part in the front seat, it is plugged in the sockets 6a on the panel 6a, or in any other convenient position. The electrical connection may be made in any suitable manner. I prefer, however, to have the device arranged so that the electrical connection acts also as a support for the device, as is shown in the drawing. In this case, for example, the part 8 will be of insulating material, or will be insulated from the plugs 7 and one plug 7 may be connected to the casing 1, which in that case will be of metal. The other plug is insulated from said casing by means of the insulating piece 13 and is connected by conductors 14 and 15 with the lamps 4. With this construction some means is provided for preventing the casing from coming in contact with the plug connected to the wires 14 and 15. One simple construction for securing this is to provide the part 16 which is connected to the plug 7 with a projections 17, see Figs. 2 and 4, which engages the casing 1 and prevents it from coming in contact with the other plug.

When a switch is used for turning on and off the light, the conductor 14 may be connected directly to the switch 18. The conductor 15, which connects the two lamps together, is connected to the other switch contact 19. When the switch is moved out of contact with the contact 19, the circuit is broken and when in contact therewith the circuit through the lamps is completed.

I claim:

1. A mirror device for automobiles comprising a casing, a mirror mounted in said casing, a light transmitting section below said mirror, a light back of and opposed to said light transmitting section, an electrical receptacle on the automobile, an electrical connection and supporting device adapted to be detachably connected with said receptacle and electrically connected with said lamp, said device including a link connection with said casing, arranged so that the casing may be moved upwardly to a position of use and downwardly out of the way when not in use.

2. A mirror device for automobiles comprising a casing, a mirror mounted in said casing, an electric light associated with said mirror for lighting up the face of the user, an electrical connection on the automobile, and an electrical connecting device carried by the casing for engaging the electrical connection on the automobile, the electrical connecting device on the casing acting as an electrical connection and also as an adjustable support for the casing.

WILLARD L. MORRISON.